(12) United States Patent
Webster et al.

(10) Patent No.: US 11,649,919 B2
(45) Date of Patent: May 16, 2023

(54) PIPE ASSEMBLY INSULATION AND VAPOR BARRIER

(71) Applicant: Victaulic Company, Easton, PA (US)

(72) Inventors: Jeffrey J. Webster, Coopersburg, PA (US); Adam M. Grey, Easton, PA (US); Jacob M. Marunich, Slatington, PA (US); Ryan D. Kuehner, Kunkletown, PA (US)

(73) Assignee: Victaulic Company, Easton, PA (US)

( * ) Notice: Subject to any disclaimer, the term of this patent is extended or adjusted under 35 U.S.C. 154(b) by 450 days.

(21) Appl. No.: 16/797,014

(22) Filed: Feb. 21, 2020

(65) Prior Publication Data
US 2020/0278070 A1 Sep. 3, 2020

Related U.S. Application Data

(60) Provisional application No. 62/811,818, filed on Feb. 28, 2019.

(51) Int. Cl.
*F16L 59/18* (2006.01)

(52) U.S. Cl.
CPC .................................. *F16L 59/18* (2013.01)

(58) Field of Classification Search
CPC ......... F16L 59/18; F16L 59/161; F16L 59/22; F16L 59/184
See application file for complete search history.

(56) References Cited

U.S. PATENT DOCUMENTS

| | | | | |
|---|---|---|---|---|
| 754,256 A * | 3/1904 | Sullivan | ................... | F16L 59/16 285/47 |
| 1,771,134 A * | 7/1930 | Morgan | ................... | F16L 59/22 285/47 |
| 1,896,225 A * | 2/1933 | Dyer | ....................... | F16L 23/00 285/294.4 |
| 2,284,335 A * | 5/1942 | Meyer | ..................... | C08F 12/08 526/213 |
| 3,631,898 A | 1/1972 | Harley | | |
| 4,553,308 A | 11/1985 | Botsolas | | |
| 4,964,470 A | 10/1990 | Gaulin | | |

(Continued)

FOREIGN PATENT DOCUMENTS

| AU | 2008233375 A1 | 5/2009 |
|---|---|---|
| CN | 104406007 | 3/2015 |

(Continued)

OTHER PUBLICATIONS

Author Unknown; FlexHead Duct Sprinkler Connections; 2 pages; Brochure Date Unknown.

*Primary Examiner* — Zachary T Dragicevich
*Assistant Examiner* — James A Linford
(74) *Attorney, Agent, or Firm* — Ballard Spahr LLP

(57) ABSTRACT

An insulating cover for assemblies including pipe elements, pipe couplings, elbows, Tees and valves also acts as a vapor barrier. Cover portions are joined along a seam which provides for a continuous seal between both the cover portions and the pipe elements which extend through channels defined in the cover. The seam includes a furrow into which sealant is forced when the cover portions are joined around the assembly. The furrow is defined by an asymmetric tongue and groove joint. Canals in the channels, in communication with the grooves, also receive the sealant to provide the continuous seal.

43 Claims, 18 Drawing Sheets

(56) References Cited

U.S. PATENT DOCUMENTS

| | | |
|---|---|---|
| 5,022,685 A | 6/1991 | Stiskin |
| 5,649,598 A | 7/1997 | MacDonald, III |
| 6,921,564 B1 | 7/2005 | Keenan |
| 9,482,381 B1 | 11/2016 | Hjelt |
| 9,791,083 B2 | 10/2017 | Gibb et al. |
| 10,156,312 B2 | 12/2018 | Dole et al. |
| 10,408,368 B2 | 9/2019 | Bancroft et al. |
| 2014/0366980 A1 | 12/2014 | Wardle |
| 2020/0166174 A1 | 5/2020 | Perry |

FOREIGN PATENT DOCUMENTS

| | | |
|---|---|---|
| CN | 106907538 | 6/2017 |
| DE | 102013108998 | 3/2015 |
| EP | 2151618 A2 | 2/2010 |
| EP | 2615351 A1 | 7/2013 |
| GB | 2296749 A | 7/1996 |
| JP | 2009127809 | 6/2009 |
| TW | 201807343 | 3/2018 |

\* cited by examiner

PIPE ASSEMBLY INSULATION AND VAPOR BARRIER

CROSS REFERENCE TO RELATED APPLICATIONS

This application is based upon and claims priority to U.S. Provisional Application No. 62/811,818, filed Feb. 28, 2019, which application is hereby incorporated by reference herein.

FIELD OF THE INVENTION

This invention concerns insulation for assemblies of pipe elements.

BACKGROUND

It is advantageous to cover piping networks to insulate the network against heat loss and help save energy, as well as to provide a vapor barrier when the piping carries chilled water. A vapor barrier will prevent condensate from forming on the chilled water pipes and mitigate or even prevent corrosion of the pipe elements.

While it is fairly straightforward to provide insulation for straight pipe runs (as pipe is controlled to a standard), creating insulation for complex pipe assemblies such as mechanical couplings, valves, elbow fittings, and Tee fittings, is a more complex undertaking. Such pipe arrangements tend not to be standardized and may comprise assemblies of many different sizes, configurations, and types. Failure of insulation, especially of its vapor barrier function, at assemblies where pipe elements are joined to one another or to fittings or components is a recognized industry challenge. If the vapor barrier is compromised in one place, that breach may compromise the entire piping system. There is clearly a need for an improved insulating cover which can provide an effective vapor barrier at assemblies where pipe elements are joined.

SUMMARY

The invention concerns a cover positionable surrounding an assembly joining pipe elements. In one example embodiment the cover comprises a first cover portion defining a first recess for receiving the assembly. The first cover portion has a first sidewall defining a first channel and a second sidewall defining a second channel. The first and second channels are in communication with the first recess. The first and second channels receive the pipe elements. A second cover portion defines a second recess for receiving the assembly. The second cover portion has a third sidewall defining a third channel and a fourth sidewall defining a fourth channel. The third and fourth channels are in communication with the second recess. The third and fourth channels also receive the pipe elements. A first perimeter face is positioned on the first cover portion. The first perimeter face surrounds the first recess and the first and second channels. A second perimeter face is positioned on the second cover portion. The second perimeter face surrounds the second recess and the third and fourth channels. The second perimeter face is engageable with the first perimeter face for joining the first and the second cover portions to one another surrounding the assembly. A first canal is positioned in the first sidewall transversely to the first channel. A second canal is position in the second sidewall transversely to the second channel. A third canal is positioned in the third sidewall transversely to the third channel. A fourth canal is positioned in the fourth sidewall transversely to the fourth channel.

By way of example, at least a first portion of the first perimeter face comprises a groove extending therealong. At least a first portion of the second perimeter face comprises a tongue extending therefrom. The tongue of the first portion of the second perimeter face is received within the groove of the first portion of the first perimeter face when the first and second cover portions are joined to one another. In an example embodiment the groove of the first portion of the first perimeter face is in fluid communication with the first and the third canals when the first and second cover portions are joined to one another. Further by way of example, at least a second portion of the first perimeter face comprises a tongue extending therefrom. At least a second portion of the second perimeter face comprises a groove extending therealong. The tongue of the second portion of the first perimeter face is received within the groove of the second portion of the second perimeter face when the first and second cover portions are joined to one another. The groove of the second portion of the second perimeter face is in fluid communication with the second and the fourth canals when the first and second cover portions are joined to one another in an example embodiment. Further by way of example, the groove in the first portion of the first perimeter face is in fluid communication with the groove in the second portion of the second perimeter face when the first and second cover portions are joined to one another. Additionally by way of example, the tongue of the first portion of the first perimeter face comprises a surface oriented angularly with respect to the second perimeter face and thereby defining a furrow between the first and second cover portions. In an example embodiment, the tongue of the second portion of the second perimeter face comprises a surface oriented angularly with respect to the first perimeter face which thereby defines a furrow between the first and second cover portions.

In another example embodiment the first perimeter face comprises first and second alignment cutouts. The second perimeter face comprises first and second alignment blocks. The first and second alignment cutouts have a complementary shape to the first and second alignment blocks so that the first and second alignment blocks interlock with the first and second alignment cutouts when the first and second cover portions are joined to one another. In a further example the first perimeter face comprises third and fourth alignment blocks. The second perimeter face comprises third and fourth alignment cutouts. The third and fourth alignment cutouts have a complementary shape to the third and fourth alignment blocks so that the third and fourth alignment blocks interlock with the third and fourth alignment cutouts when the first and second cover portions are joined to one another. In a specific example embodiment the alignment blocks are and the alignment cutouts are step-shaped.

An example embodiment further comprises a seal positioned within the canals and within the furrow. The seal completely surrounds the first and second recesses in this example. An example may further comprise an opening in the first and second cover portions. The opening is located along the first and second perimeter faces. A fifth canal on the first cover portion extends along the opening and a sixth canal extends along the second cover portion. The canals are in fluid communication with the furrow and receive the seal. In an example embodiment the seal is selected from the group consisting essentially of a continuous gasket, an extruded caulk, a rope caulk, and combinations thereof. Further by way of example the first and second cover portions comprise a foam layer. In a specific example embodiment the foam layer has an insulation value of at least R=5 per inch of thickness. In a further example the foam layer comprises polyisocyanurate. An example cover may further comprise a coating of polyvinyldiene chloride on the foam layer. Further by way of example, the cover comprises an exterior coating surrounding the foam layer. By way of example, the exterior coating is selected from the group consisting essentially of polyurea, polyvinylchloride, polyvinyldiene chloride and combinations thereof. In a further example, the foam layer and the exterior coating achieve a rating of less than 25/50 per ASTM E84 test criterial for flame propagation and smoke.

The invention further encompasses a cover positionable surrounding an assembly joining first and second pipe elements to one another. By way of example the cover comprises a first cover portion defining a first recess for receiving the assembly. The first cover portion defines first and second channels for receiving the first pipe element. The first and second channels are in communication with the first recess. A second cover portion defines a second recess for receiving the assembly. The second cover portion defines third and fourth channels for receiving the second pipe element. The third and fourth channels are in communication with the second recess. The first and second cover portions are joined to one another to surround the assembly and the pipe elements at a seam. The seam comprises a furrow facing outwardly away from the first and second recesses.

In an example embodiment the furrow has an asymmetrical cross sectional shape. Further by way of example, a seal is positioned within the furrow. An example embodiment further comprises a first canal positioned within the first channel and in fluid communication with the furrow. A second canal is positioned within the second channel and in fluid communication with the furrow. A third canal is positioned within the third channel and in fluid communication with the furrow. A fourth canal is positioned within the fourth channel and in fluid communication with the furrow. In a specific example embodiment, each of the canals has an asymmetrical cross section. Further by way of example, each of the canals faces outwardly away from the first and second recesses.

An example embodiment further comprises a seal positioned within the canals and within the furrow. The seal completely surrounds the first and second recesses in this example. By way of further example, the seal is selected from the group consisting essentially of a continuous gasket, an extruded caulk, a rope caulk, and combinations thereof. In an example embodiment the first and second cover portions comprise a foam layer. Further by way of example the foam layer has an insulation value of at least R=5 per inch of thickness. In an example embodiment the foam layer comprises polyisocyanurate. A coating of polyvinyldiene chloride is on the foam layer in an example embodiment. An example cover embodiment may further comprise an exterior coating surrounding the foam layer. By way of example, the exterior coating is selected from the group consisting essentially of polyurea, polyvinylchloride, polyvinyldiene chloride and combinations thereof. By way of further example, the foam layer and the exterior coating achieve a rating of less than 25/50 per ASTM E84 test criterial for flame propagation and smoke.

An example cover embodiment further comprises an opening in at least one of the cover portions. The opening is located along the seam and interrupts the furrow. A canal extends along the opening. The canal is in fluid communication with the furrow and receives the seal.

In an example embodiment the first cover portion defines a first opening portion located along the seam. The second cover portion defines a second opening portion located along the seam. The first and second opening portions are aligned to form an opening in the cover. A first canal surrounds the first opening portion and is in fluid communication with the furrow. A second canal surrounding the second opening portion and is in fluid communication with the furrow. In this example the seal is received in the first and second canals. Further by way of example, at least a portion of the seam is defined by a tongue extending from the first cover portion. The tongue is received within a groove positioned in the second cover portion. In an example embodiment the furrow is defined by a first surface on one of the first and second cover portions oriented angularly with respect to a second surface on the other of the first and second cover portions. The first and second surfaces are in facing relationship. In an example embodiment, the first surface is positioned on the first cover portion adjacent to the tongue. Further by way of example, the first and third channels surround a first bore. The second and fourth channels surround a second bore. The first and second bores are aligned with one another in this example.

The invention also encompasses a cover in combination with the assembly including the first and second pipe elements. In an example embodiment the assembly comprises a coupling joining the pipe elements in end to end relation. In an example embodiment of a combination with the assembly and the first and second pipe elements, the assembly comprises a valve. A first pipe coupling attaches the first pipe elements to the valve. A second pipe coupling attaches the second pipe element to the valve.

In another example embodiment the first and third channels surround a first bore. The second and fourth channels surround a second bore. The first and second bores are not aligned with one another in this example.

In an example combination of the cover, the assembly including the first and second pipe elements, the assembly comprises an elbow fitting. A first coupling joins the first pipe element to the elbow fitting. A second coupling joins the second pipe element to the elbow fitting.

An example cover according to the invention is used for further joining the first and second pipe elements to a third pipe element. In an example embodiment he first cover portion defines a fifth channel for receiving the third pipe element. The fifth channel is in communication with the first recess. The second cover portion defines a sixth channel for receiving the third pipe element. The sixth channel is in communication with the second recess. The fifth and sixth channels surround a third bore in this example. The third bore is not aligned with the first and the second bores.

Another example combination comprises a Tee fitting. A first coupling joins the first pipe element to the Tee fitting. A second coupling joins the second pipe element to the Tee fitting. A third coupling joins the third pipe element to the Tee fitting in this example embodiment.

DETAILED DESCRIPTION

Figure 1:
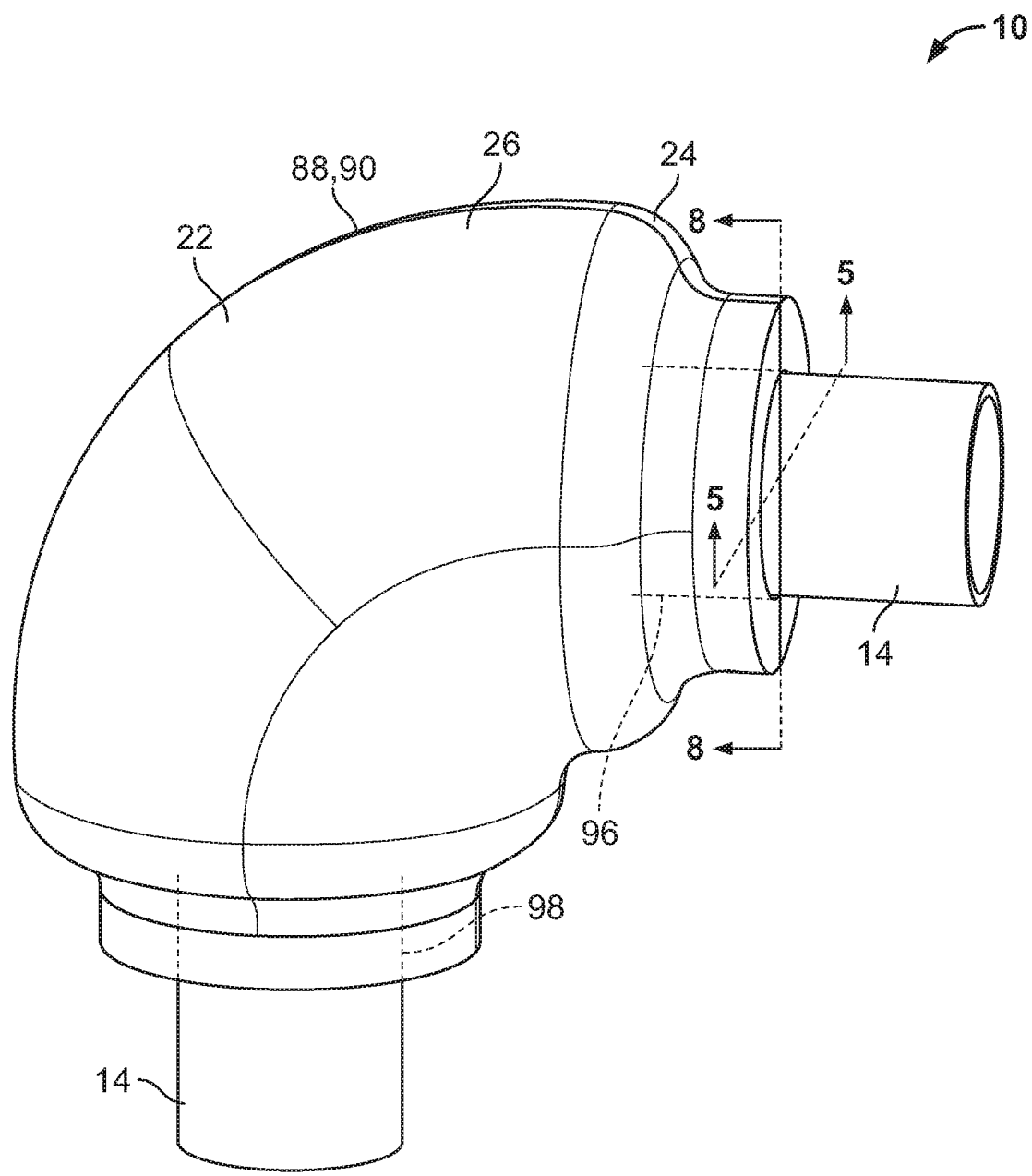
FIG. 1 is an isometric view of an example cover according to the invention.
Figure 2:
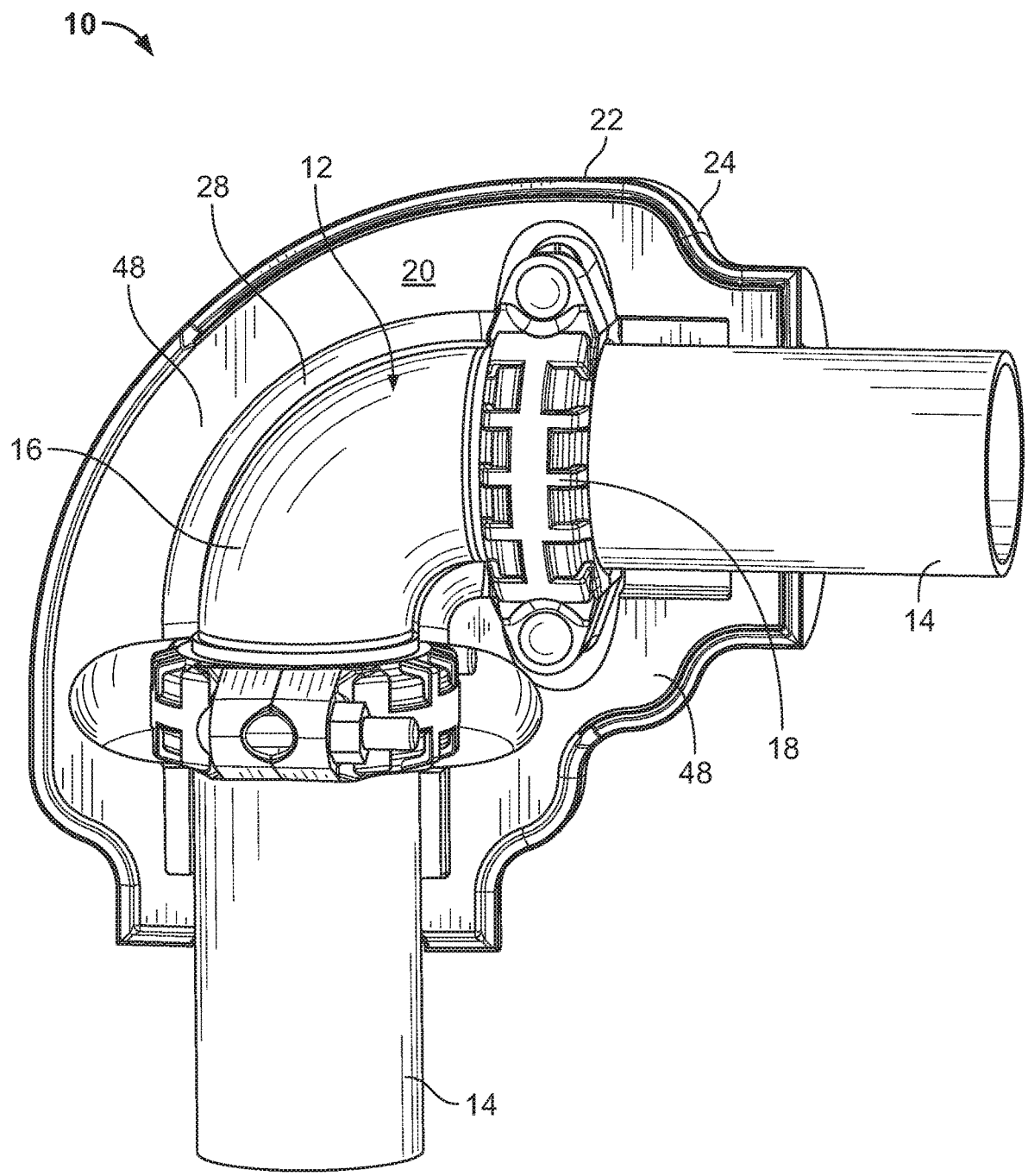
FIG. 2 is an isometric view of the cover shown in FIG. 1 with a portion of the cover removed.

FIGS. 1 and 2 show an example cover 10 for insulating an assembly 12 joining pipe elements 14. By way of example, assembly 12 comprises a grooved elbow fitting 16 and two mechanical couplings 18. The cover could also be employed to insulate assemblies of other types, including single mechanical couplings for a straight connections, Tee fittings and valves as well as flanges, threaded or welded fittings and the like. In this example embodiment, cover 10 comprises a foam layer 20, made of a material such as polyisocyanurate having a high insulation ("R") value of R=5 per inch of thickness or greater. The foam layer 20 may have an exterior coating 22 which provides a vapor barrier of low permeability, mechanical durability, and weather resistance. Exterior coating 22 is advantageously polyurea, and it is desired that the foam layer 20 and coating 22 achieve a rating of less than 25/50 per ASTM E84 test criteria for flame propagation and smoke developed, respectively. The exterior coating 22 may also be provided by a shell of polyvinylchloride (PVC). To provide further resistance to permeability, a supplementary coating of polyvinyldiene chloride may also be applied either to the external coating 22, or to the foam layer 20 prior to the application of external coating 22. In addition to insulating the assembly 12 and pipe elements 14 to prevent energy loss, the cover 10 is also expected to provide a vapor barrier to prevent condensate from forming, for example, when the pipe elements carry chilled water in a humid environment.

Figure 3:
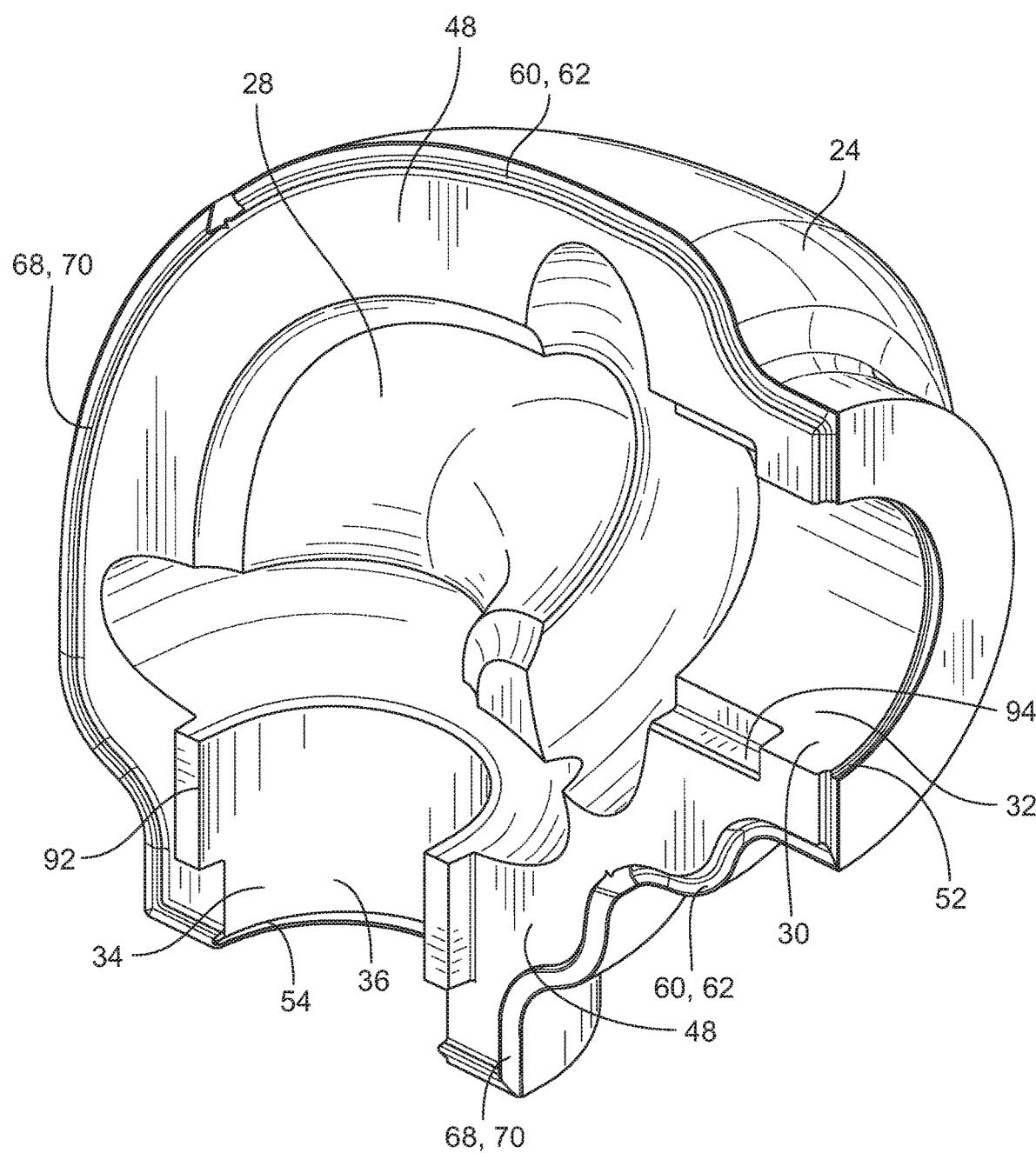
FIGS. 3 and 4 are isometric views showing the interior of the cover portions of FIG. 1.
Figure 4:
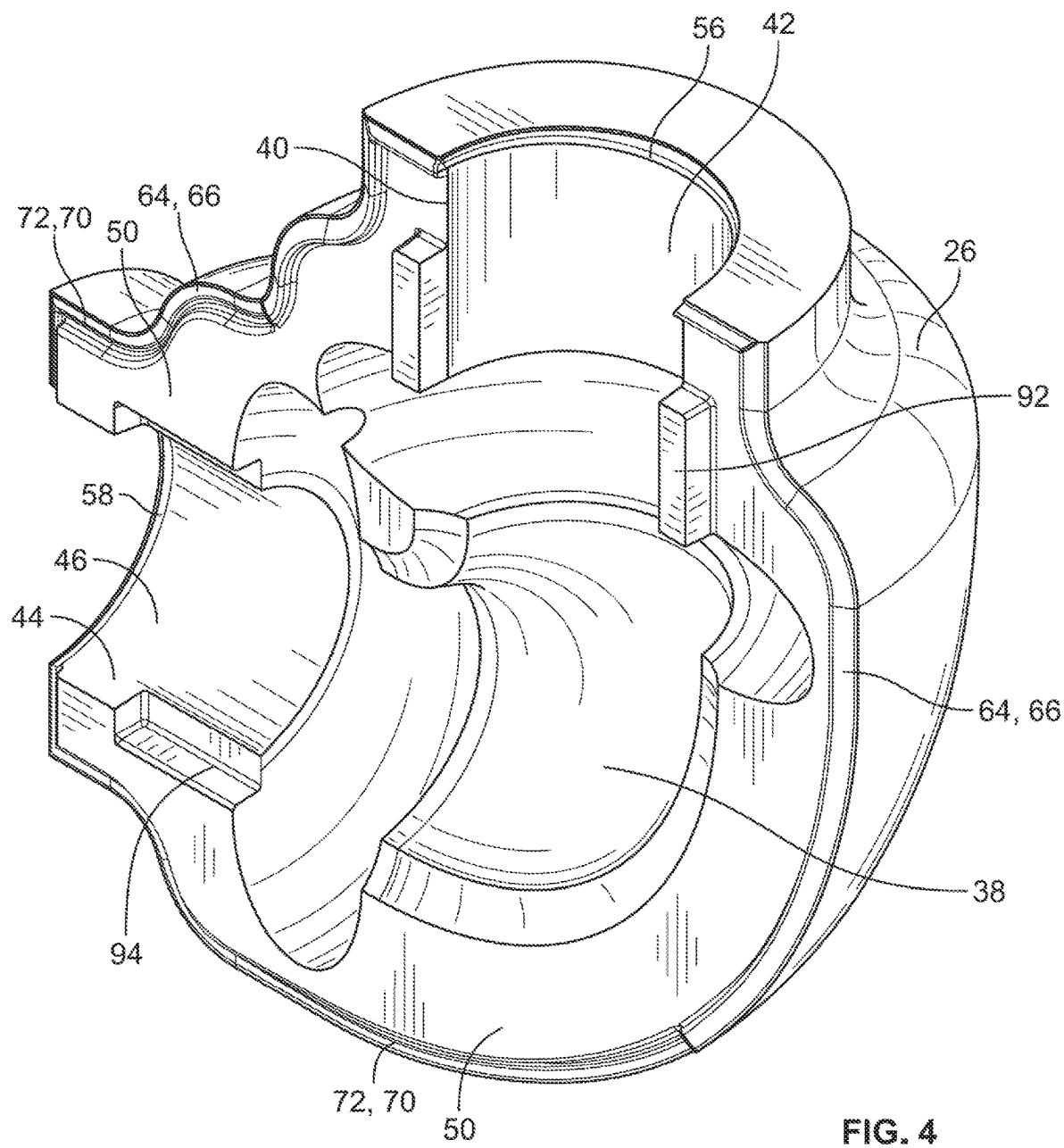

An example cover 10 according to the invention comprises first and second cover portions 24 and 26. As shown in FIG. 3, the first cover portion 24 defines a first recess 28 for receiving the assembly 12. First recess 28 is advantageously designed to be of sufficient volume such that it can accommodate known variations of the assembly, such as, in this example, the rotation of couplings 18 about the axes of the pipes to which they are connected (FIG. 2). First cover portion 24 also has a first sidewall 30 which defines a first channel 32, and a second sidewall 34 which defines a second channel 36. Both the first and second channels 32 and 36 are in communication with the first recess 28 and receive the pipe elements 14. As shown in FIG. 4, the second cover portion 26 defines a second recess 38 for receiving the assembly 12 as well as a third sidewall 40 defining a third channel 42 and a fourth sidewall 44 defining a fourth channel 46 for receiving the pipe elements 14. The third and fourth channels 42 and 46 are in communication with the second recess 38, and, the second recess and third and fourth channels, being respective mirror images of the first recess and first and second channels, allow the first and second cover portions 24 and 26 to cooperate to surround and insulate the assembly 12 and portions of the pipe elements 14 included in the assembly as shown in FIG. 1.

As shown in FIGS. 2 and 3, a first perimeter face 48 is positioned on the first cover portion 24. First perimeter face 48 surrounds the first recess 38 and the first and second channels 32 and 36. As shown in FIG. 4, second cover portion 26 has a second perimeter face 50 which is a mirror image of the first perimeter face 48. The second perimeter face 50 surrounds the second recess 38 and the third and fourth channels 42 and 46. The first and second perimeter faces 48 and 50 are the interface surfaces at which the first and second cover portions 24 and 26 are joined to surround the assembly 12. As shown in FIG. 3, a first canal 52 is positioned in the first sidewall 30, the first canal being oriented transversely to the first channel 32. A second canal 54 is positioned in the second sidewall 34 and oriented transversely to the second channel 36. As shown in FIG. 4, a third canal 56 is positioned in the third sidewall 40 of the second cover portion 26 and a fourth canal 58 is positioned in the fourth sidewall 44 of the second cover portion 26. Analogously to the first and second canals 52 and 54, the third and fourth canals 56 and 58 are oriented transversely to the third and fourth channels (42 and 46, respectively) of the second cover portion 26.

Figure 5:
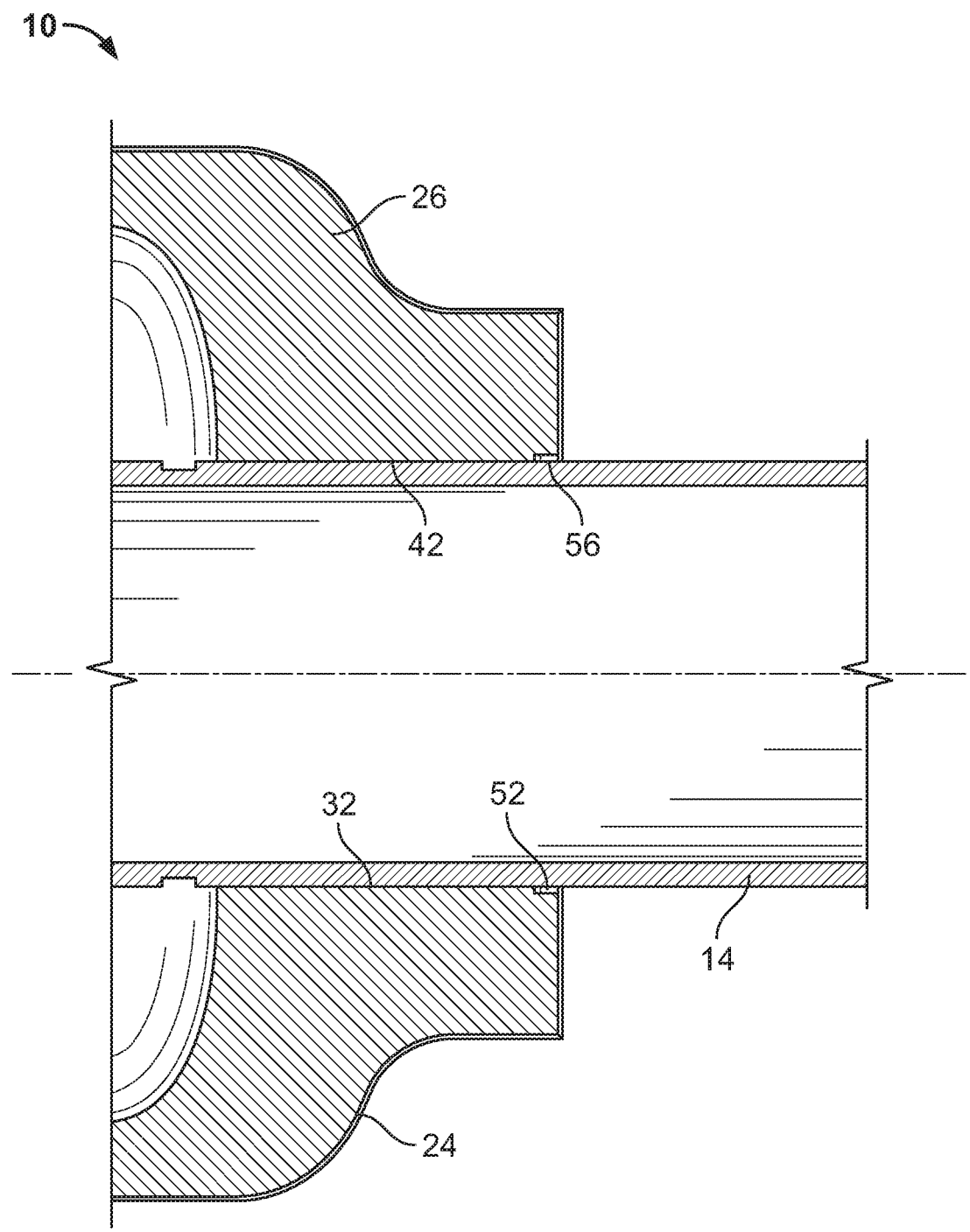
FIG. 5 is a partial sectional view taken at line 5-5 of FIG. 1.

FIG. 5 shows a sectional view of a portion of the cover 10 taken at line 5-5 of FIG. 1 in a direction perpendicular to the first and second perimeter faces 48 and 50 thereby showing the first canal 52 in the first channel 32 of the first cover portion 24 and the third canal 56 in the third channel 42 of the second cover portion 26. The first and third canals 52 and 56 circumferentially surround the pipe element 14 and provide a region for a seal to reside and completely seal the interface between the first and third channels 32 and 42 and the pipe element 14. The configuration of the second and fourth canals 54 and 58 is similar for sealing the interface between pipe element 14 and the second and fourth channels 36 and 46 of the first and second cover portions (not shown). Using the canals to seal the pipe elements 14 is expected to provide significant advantage over prior art insulation systems, as moisture ingress often occurs at the interface between the insulation layers and the pipe elements.

Figure 6:
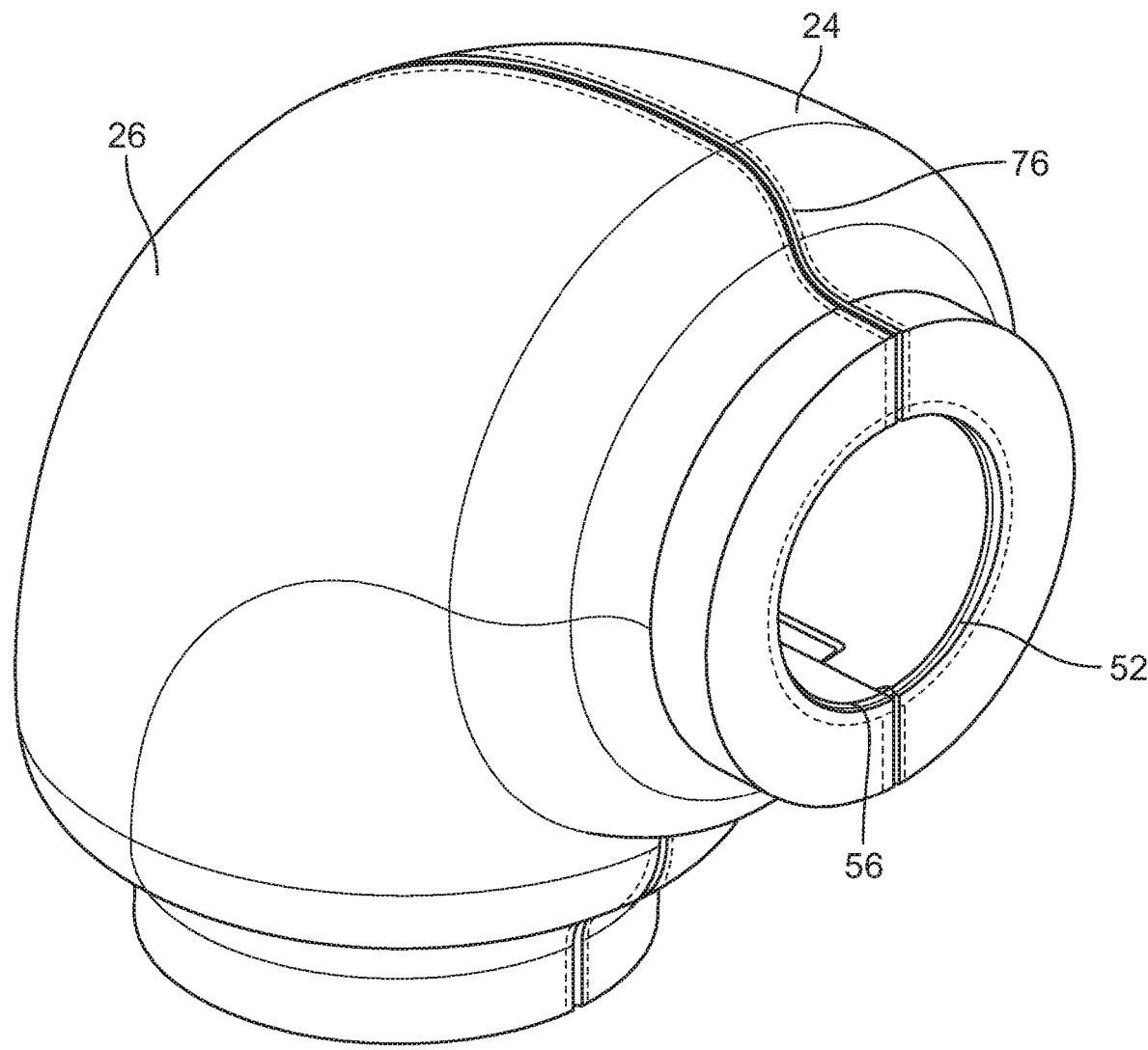
FIG. 6 is an isometric view of the cover shown in FIG. 1.

As shown in FIGS. 3 and 4, it is advantageous to use a tongue and groove arrangement to join the first and second cover portions 24 and 26. In this example embodiment the cover portions are advantageously designed to eliminate the need for differentiated "male" and "female" counterparts. The first and second perimeter faces 48 and 50 of the cover portions 24 and 26 (respectively) are inverted mirror images of each other. To that end, at least a first portion 60 of the first perimeter face 48 of the first cover portion 24 comprises a groove 62 extending therealong. This groove 62 receives a tongue 64 extending along a first portion 66 of the second perimeter face 50 of the second cover portion 26. Furthermore, the groove 62 in the first portion 60 of the first perimeter face 48 of the first cover portion 24 is in fluid communication with the first canal 52 of the first channel 32 as well as the third canal 56 of the third channel 42 of the second cover portion 26, thereby providing a region continuous with the groove 62 where a seal can reside which seals between the pipe element 14 and the channels 32 and 42. Consistent with the asexual design of the cover 10, at least a second portion 68 of the first perimeter face 48 of the first cover portion 24 comprises a tongue 70 extending therefrom. Tongue 70 is received within a mating groove 72 in a second portion 74 of the second perimeter face 50 of the second cover portion 26. Groove 72 is furthermore in fluid communication with the second canal 54 of the second channel 36 and the fourth canal 58 of the fourth channel 46, thus providing a region continuous with the groove 72 where a seal can reside which seals between the pipe element 14 and the second and fourth channels 36 and 46. Upon assembly of cover portions 24 and 26, the groove 62 within the first portion 60 of the first perimeter face 48 of the first cover portion 24 is in fluid communication with the groove 72 in the second portion 74 of the second perimeter face 50 of the second cover portion 26. The grooves 62 and 72 within the various portions of the first and second cover portions combine to form a continuous three dimensional perimeter 76 in fluid communication, which is shown outlined in broken line in FIG. 6 and is seen to continuously traverse the tongue and groove interface between the first and second cover portions 24 and 26 as well as the canals 52, 54, 56 and 58 (canals 52 and 56 visible) surrounding the pipe elements. Thus the combination grooves and canals permit the entire cover 10 to be completely sealed by a seal, which is preferentially contiguous, extending between the cover portions 24 and 26 as well as between the cover portions and the pipe elements 14, isolating the recesses 28 and 30 and the assembly 12 therein from the environment outside of the insulation cover.

Figure 7:
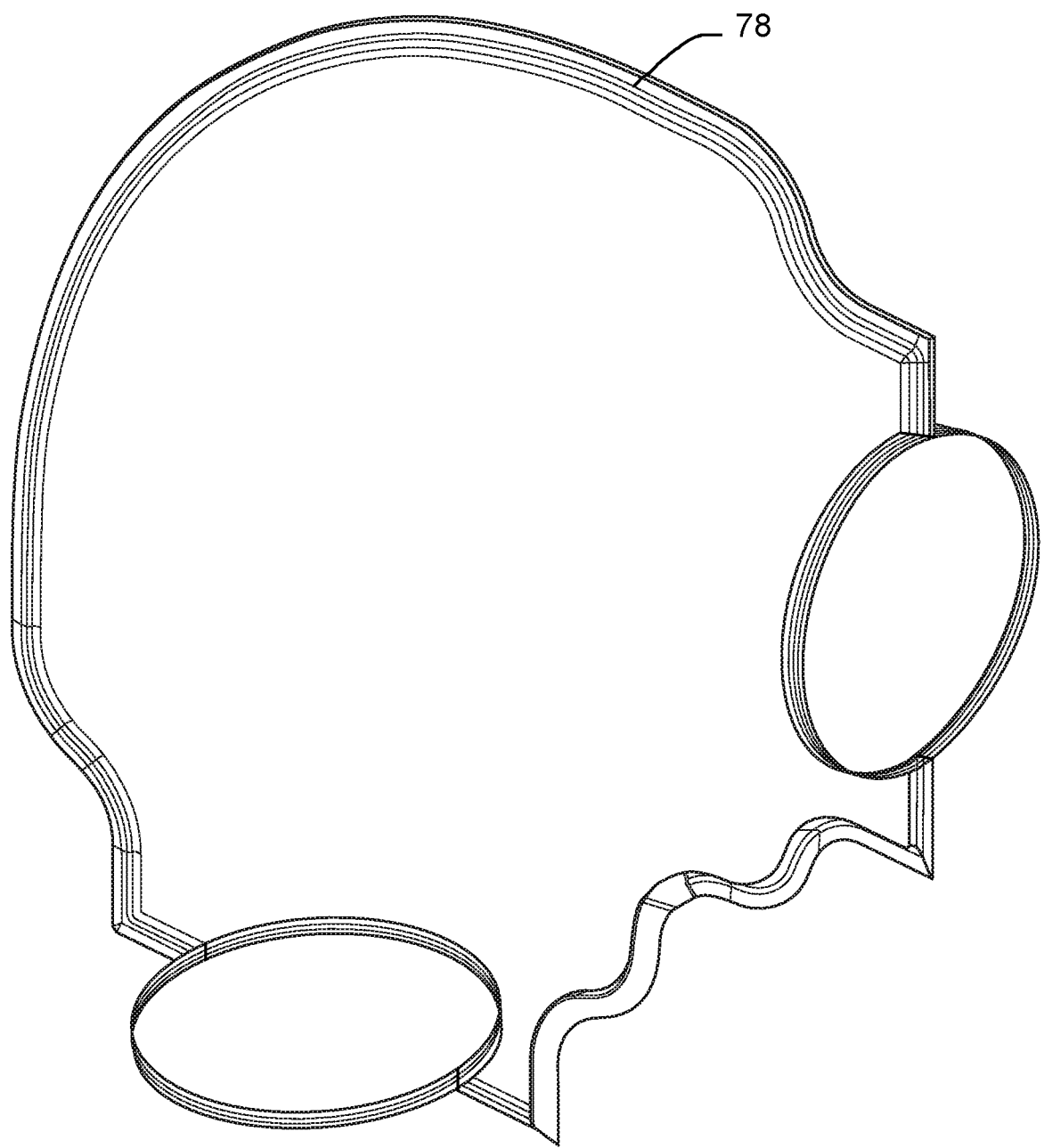
FIG. 7 is an isometric view of a seal used with the cover shown in FIG. 1.

FIG. 7 shows an example of a seal 78 which is received within the grooves and canals forming the three dimensional perimeter 76. Seal 78 may comprise an extruded sealant, such as a caulk, applied directly to the grooves and canals prior to assembling the cover portions 24 and 26 to one another about the assembly 12. In another embodiment, the seal 78 could be formed from a rope caulk laid in the grooves and canals of the cover portions. In a further embodiment, the seal 78 could be a continuous or partially continuous gasket which is applied, wholly or in piece parts to the grooves and canals of one or the other or both cover portions prior to assembly. During assembly of the various seal embodiments with the cover portions the tongue and groove joints between the cover portions are designed to force the seal toward the outer surface of the cover 10 as described below.

Figures 8, 8A:
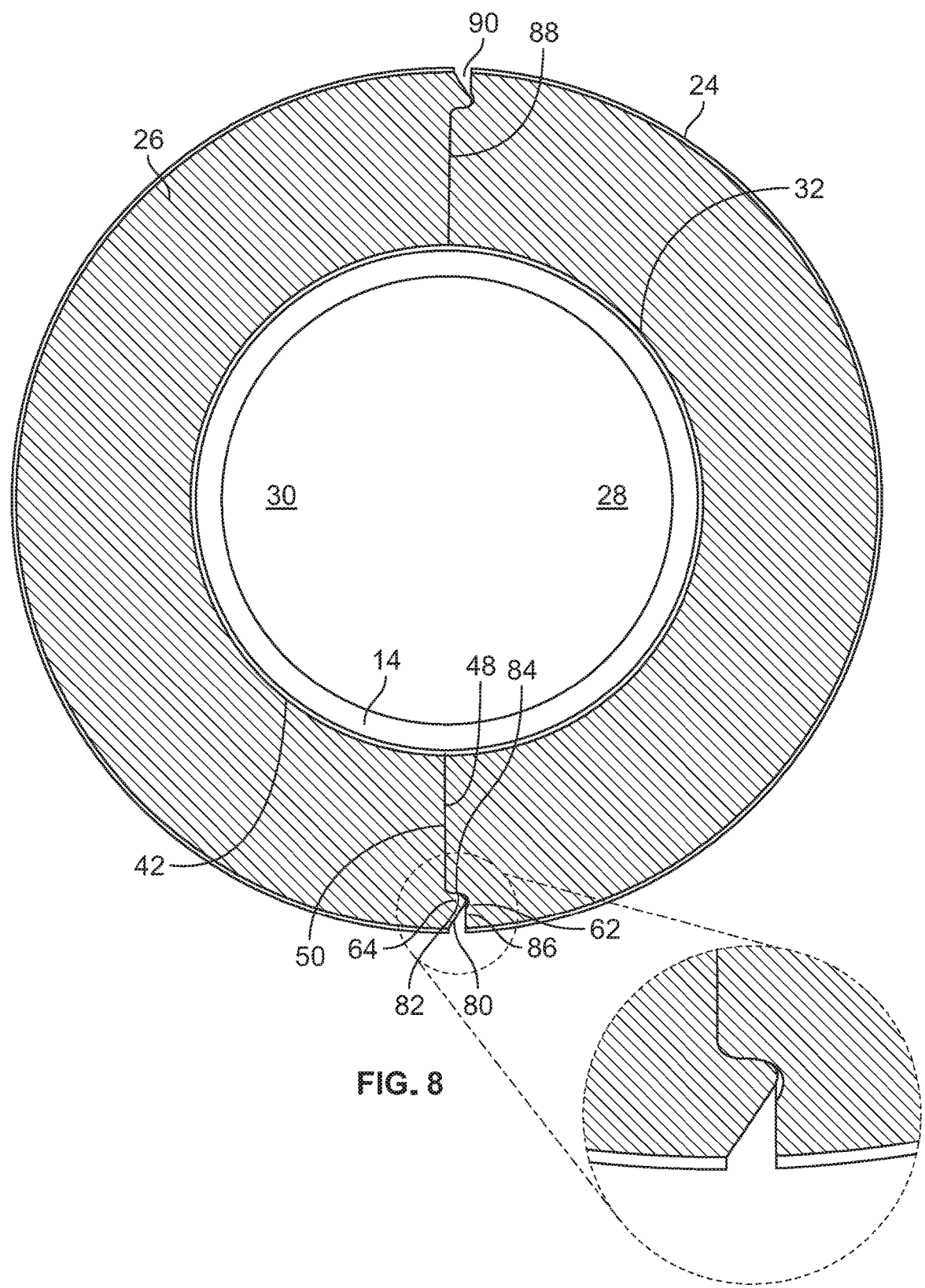
FIG. 8 is a partial sectional view taken at line 8-8 of FIG. 1.
FIG. 8A shows a portion of FIG. 8 on an enlarged scale.
Figure 9:
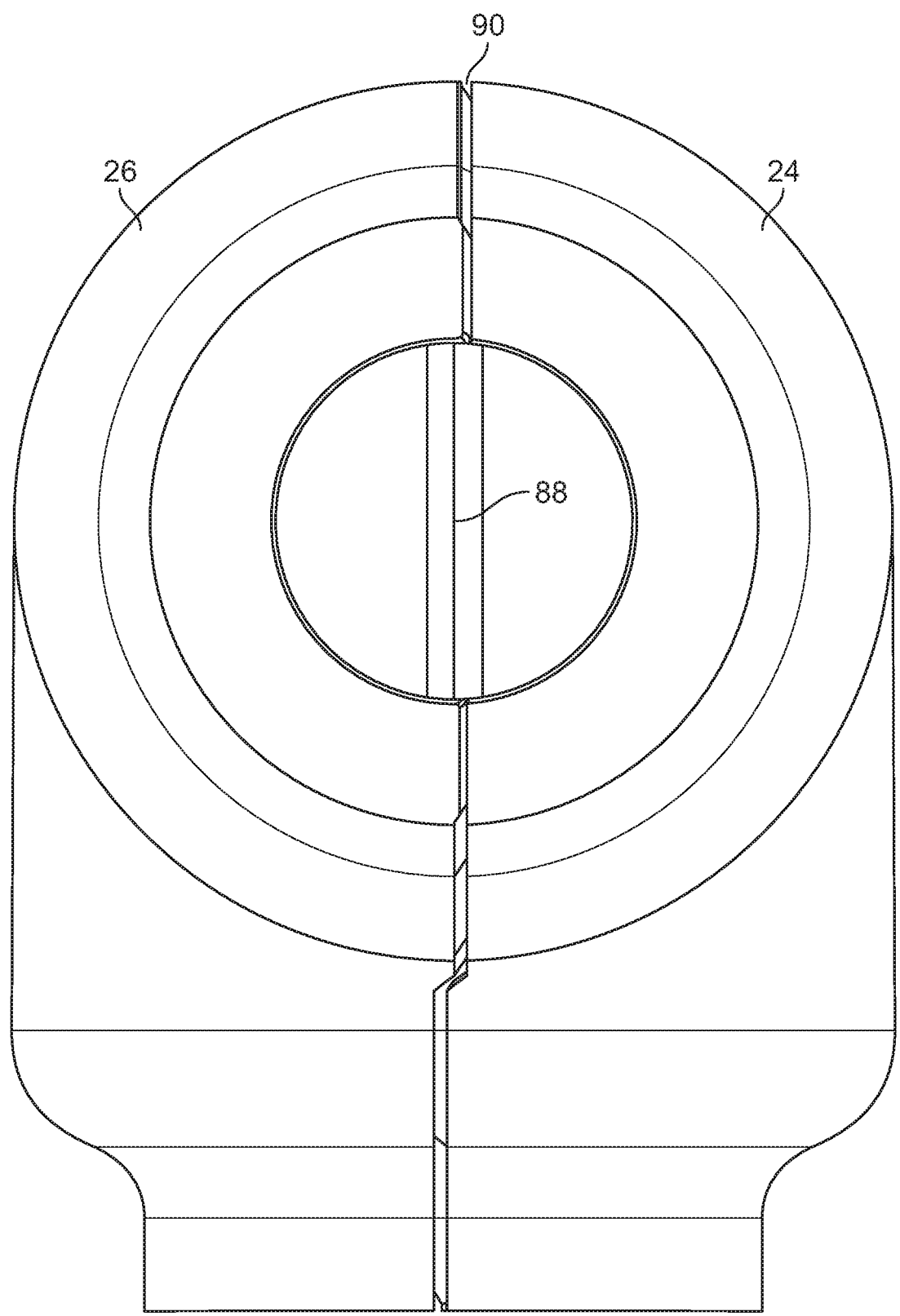
FIG. 9 is an elevational view of the coupling shown in FIG. 1.

FIGS. 8 and 8A show a cross section of an example tongue 64 and groove 62 in detail (tongue and groove 70 and 72 may be similar). In this example, tongue 64 is asymmetric and comprises a relief surface 80, oriented angularly with respect to the second perimeter face 50 of the second cover portion 26. Tongue 64 further comprises an action surface 82 also oriented angularly with respect to the second perimeter face 50 of the second cover portion 26. The tongue 64 engages the groove 62 in the first portion 60 of the first perimeter face 48 of the first cover portion 24 (see FIG. 3). In this example, groove 62 is also asymmetric and comprises a back wall 84 configured to mate with the action surface 82 of tongue 64. Groove 62 further comprises a trough 86 positioned adjacent to the back wall 84 and extending into the first perimeter face 48. The engagement between groove 62 and tongue 64 is at a seam 88 which comprises a furrow 90 between the first and second cover portions 24 and 26. Due to the asymmetries of the groove 62 and tongue 64 furrow 90 has an asymmetrical cross sectional shape and faces outwardly away from the channels 32, 36, 42 and 46 (32 and 42 shown) as well as the recesses 28 and 30. By opening outwardly the furrow 90 provides a visual cue to the user that suggests that it is intended to accept a seal. As shown in FIG. 9, the furrow 90 is present where the tongue and groove join and can be used after assembly to provide visual confirmation that the seam 88 between the cover portions has been adequately sealed because the seal 78 (see FIG. 7) will appear within the furrow 90 when forced out of the groove 62 when engaged by the tongue 64. Through the geometrical arrangement of the asymmetrical tongue 64 and groove 62 as shown in FIG. 8, in particular the engagement of action surface 82 with back wall 84 in the presence of adjacent trough 86 and relief surface 80, the seal is preferentially forced outward into furrow 90, instead of inwardly between the perimeter faces 48 and 50 of the cover portions 22 and 24. This geometric arrangement is produced by ensuring that furrow 90 represents the "path of least resistance" to the flow of the seal as tongue 64 is brought into engagement with groove 62 during assembly. In this embodiment, the seal placed in groove 62 would face less resistance by flowing outwardly into furrow 90, than to flow inwardly over back wall 84 and between perimeter faces 48 and 50. As the curing of commonly-available sealing materials requires exposure to atmospheric moisture or oxygen, this preferential outward flow of seal 78 promotes a faster and more complete curing by preferentially moving that material outwardly into the furrow 90. The volume defined by furrow 90 may also be advantageously set to accommodate a bead of sealant of customary size (a bead of ⅛" to approximately ⅜" in diameter being customary) to limit the likelihood that the seal 78 will extend beyond the volume defined by the furrow 90 (which would be considered undesirable) while still providing for visual confirmation of an adequate seal between the cover portions 24 and 26. The flow of the seal 78 may be the same as described above for the engagement of tongue 70 with groove 72, and the fact that the grooves 62 and 72 are in fluid communication will yield a continuous seal visible in a continuous furrow 90 extending along the entire seam 88 between the cover portions 24 and 26.

In addition to the tongue and groove, a rabbet joint may also be used at the seam 88 between the first and second cover portions 22 and 24. As shown in FIG. 3, to ensure proper alignment of the cover portions 24 and 26 when being joined, alignment blocks 92 are positioned adjacent to the second channel 36 and cutouts 94 are positioned adjacent to the first channel 32 in the first cover portion 24. Consistent with the asexual nature of the cover, as shown in FIG. 4, alignment blocks 92 are also positioned adjacent to the third channel 42 and cutouts 94 are positioned adjacent to the fourth channel 46 of the second cover portion 26. When the cover portions are joined the alignment blocks 92 engage the cutouts 94 in each cover portion to ensure a proper fit. Use of a rabbet joint, with step-shaped alignment blocks and cutouts as shown, allows for an interference fit which provides a mechanical interlock of the cover portions upon initial assembly, thereby minimizing the need for additional work-holding during final assembly.

As shown in FIG. 5, the canals 52, 54, 56 and 58 (52 and 56 shown) may also be advantageously designed to allow the seal 78 to be forced outwardly toward the surface of the cover portions 24 and 26 and thereby provide visible evidence of a complete seal of the cover 10 around the assembly 12. First and third canals 52 and 56 are shown by way of example as having asymmetric cross sectional shapes as well as being oriented to face outwardly away from the recesses 28 and 38. This arrangement will force the seal 78 to move outwardly toward the outer surface of the cover when the cover portions 24 and 26 are assembled about the assembly 12. The second and fourth canals 54 and 58, although not shown, may be similarly shaped and arranged.

FIGS. 1, 3 and 4 show the example cover embodiment 10 wherein the first and third channels 32 and 42 surround a first bore 96 and the second and fourth channels 36 and 46 surround a second bore 98. Bores 96 and 98 are not axially aligned with one another which allows the cover 10 to cover the assembly 12 comprising the elbow fitting 16, mechanical couplings 18 and pipe elements 14.

Figure 10:
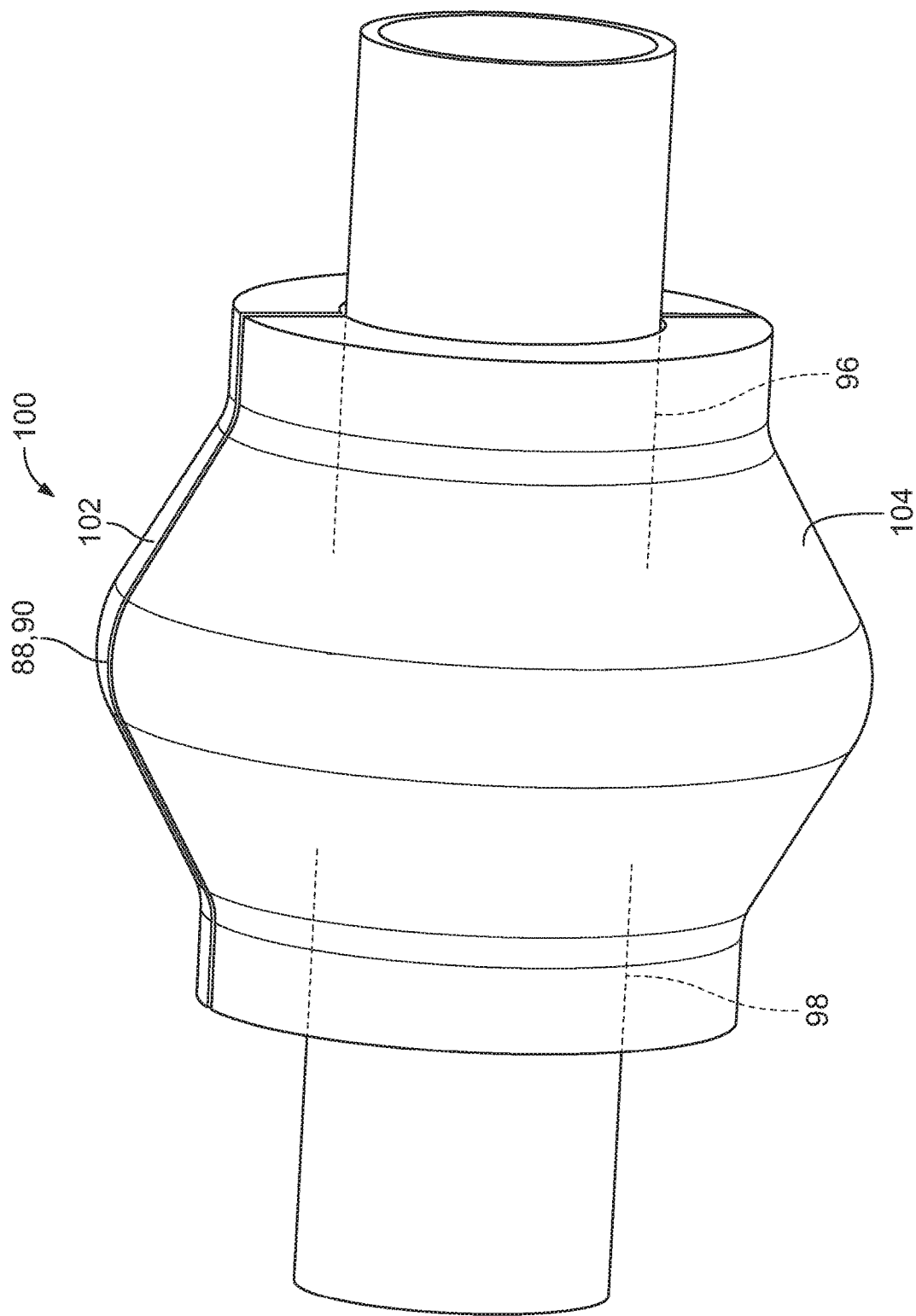
FIG. 10 is an isometric view of another example embodiment of a coupling according to the invention.
Figure 11:
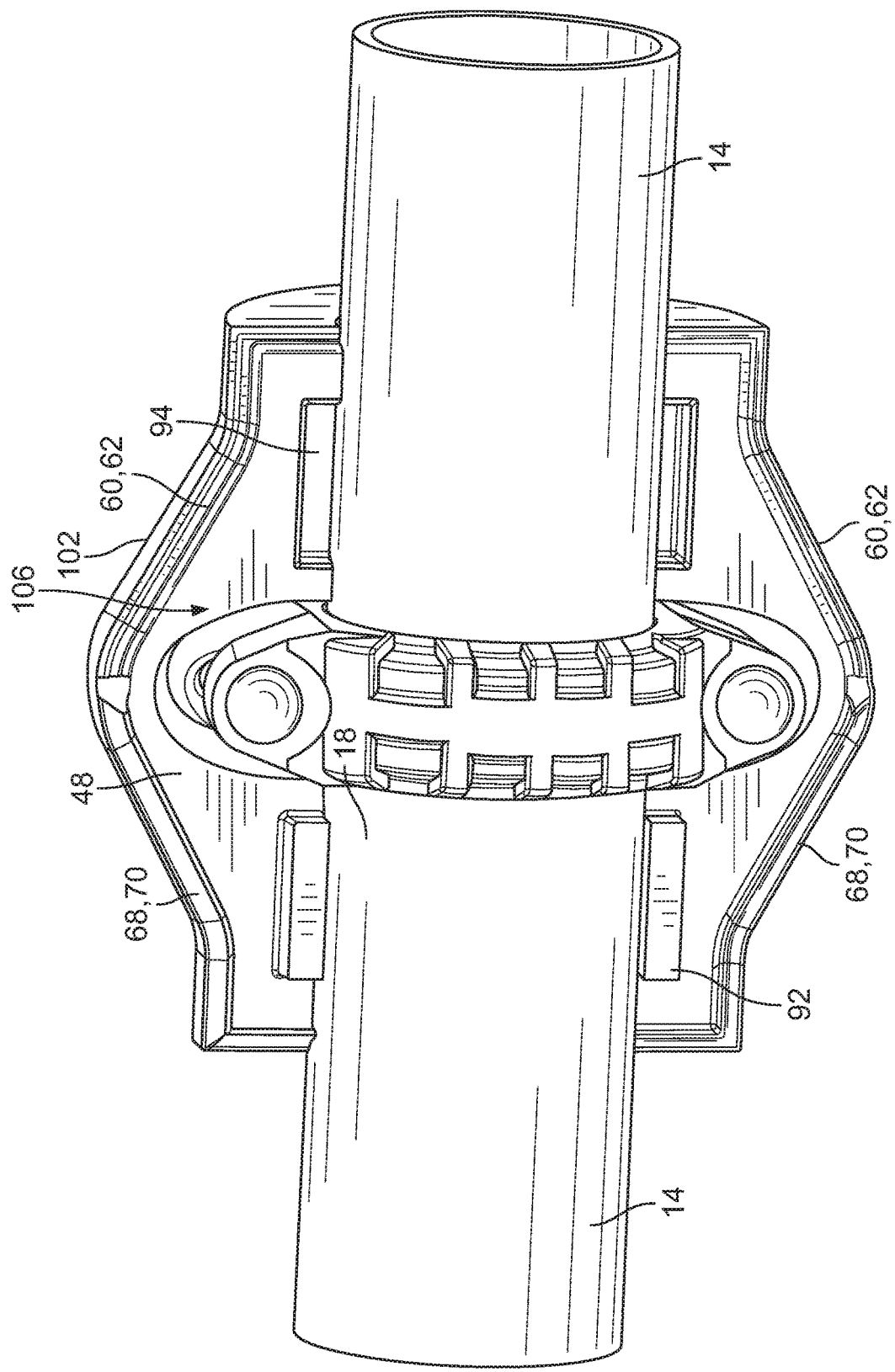
FIG. 11 is an isometric view of the coupling shown in FIG. 10 with a portion of the cover removed.
Figure 12:
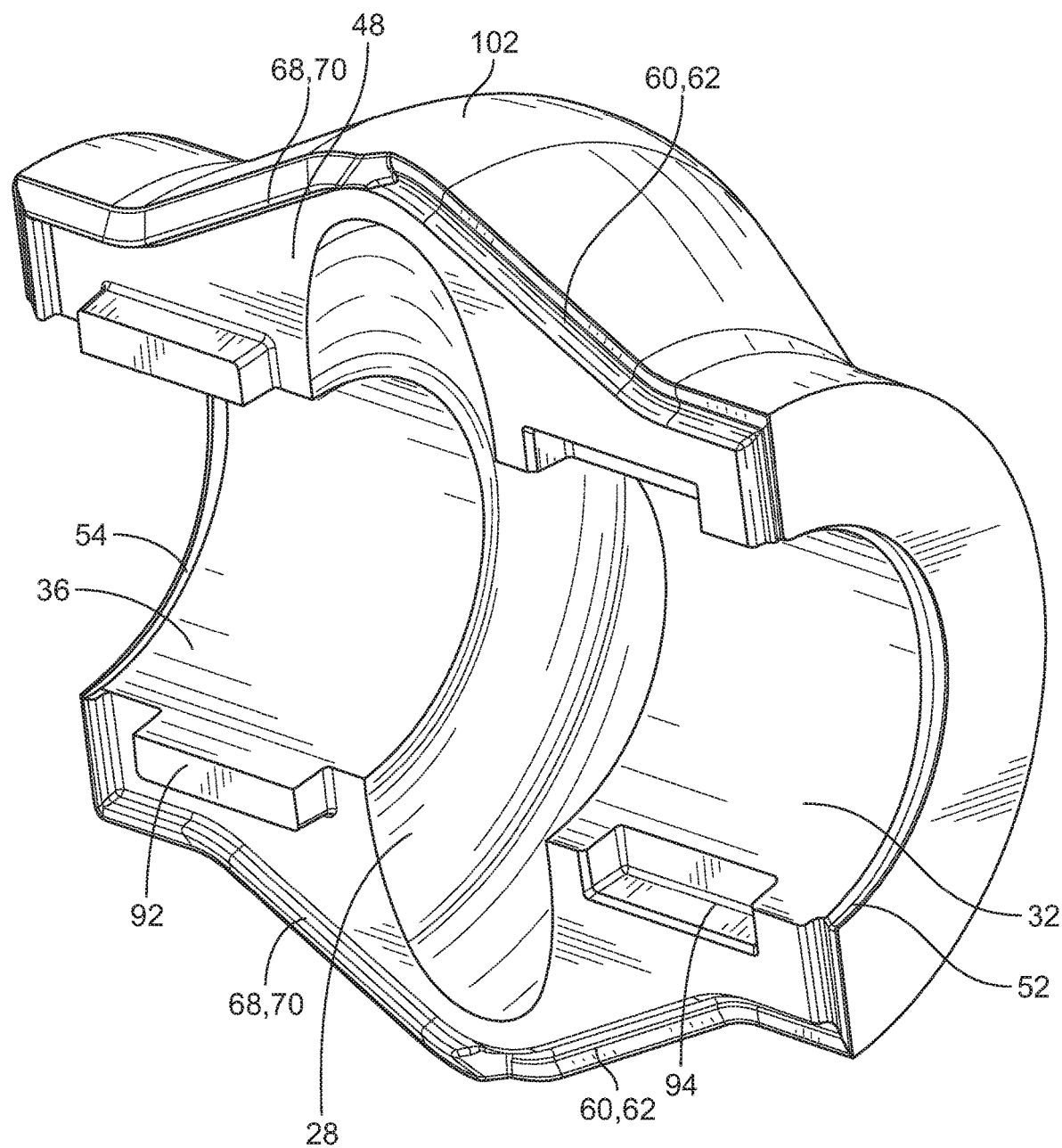
FIG. 12 is an isometric view showing the interior of a cover portion shown in FIG. 10.

FIGS. 10 through 12 illustrate another example cover embodiment 100 comprising first and second cover portions 102 and 104. Cover portions 102 and 104 have many of the same features as described above for cover portions 24 and 26, with like reference characters being used to identify like elements. The first and second bores 96 and 98 of cover 100 are axially aligned which permits cover 100 to be used with an assembly 106 comprising a mechanical coupling 18 joining pipe elements 14 in end to end relation.

Figure 13:
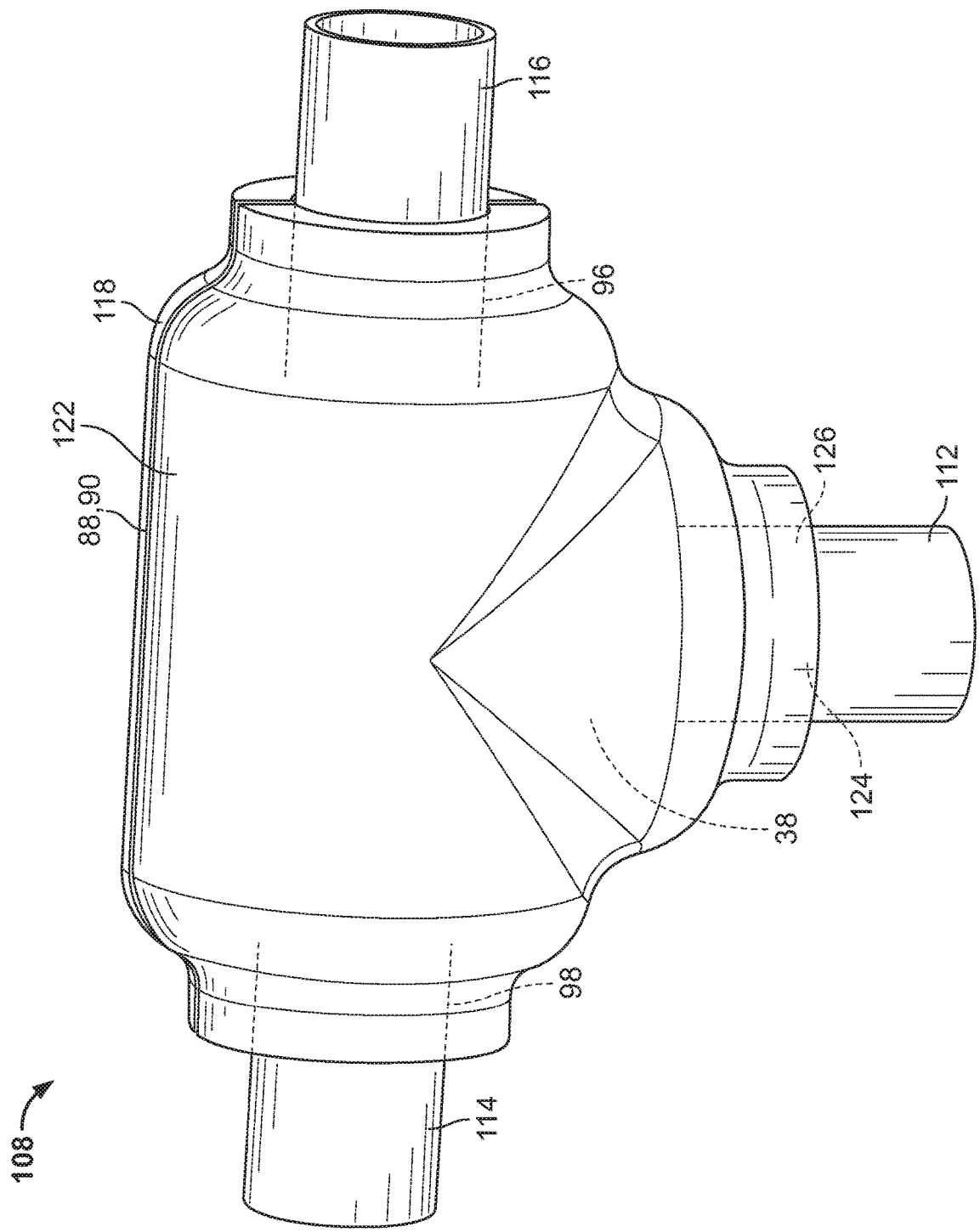
FIG. 13 is an isometric view of another example embodiment of a coupling according to the invention.
Figure 14:
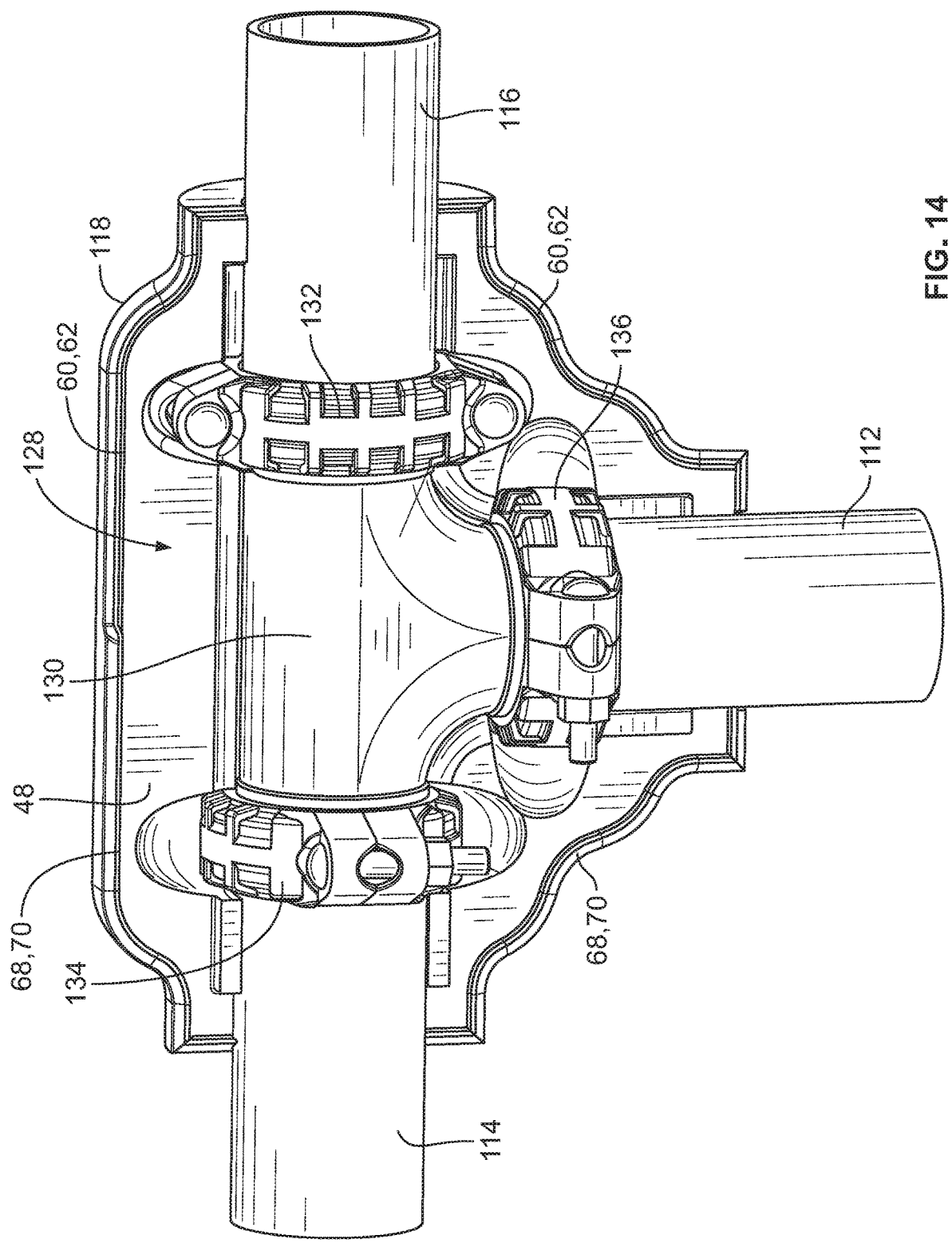
FIG. 14 is an isometric view of the coupling shown in FIG. 13 with a portion of the cover removed.
Figure 15:
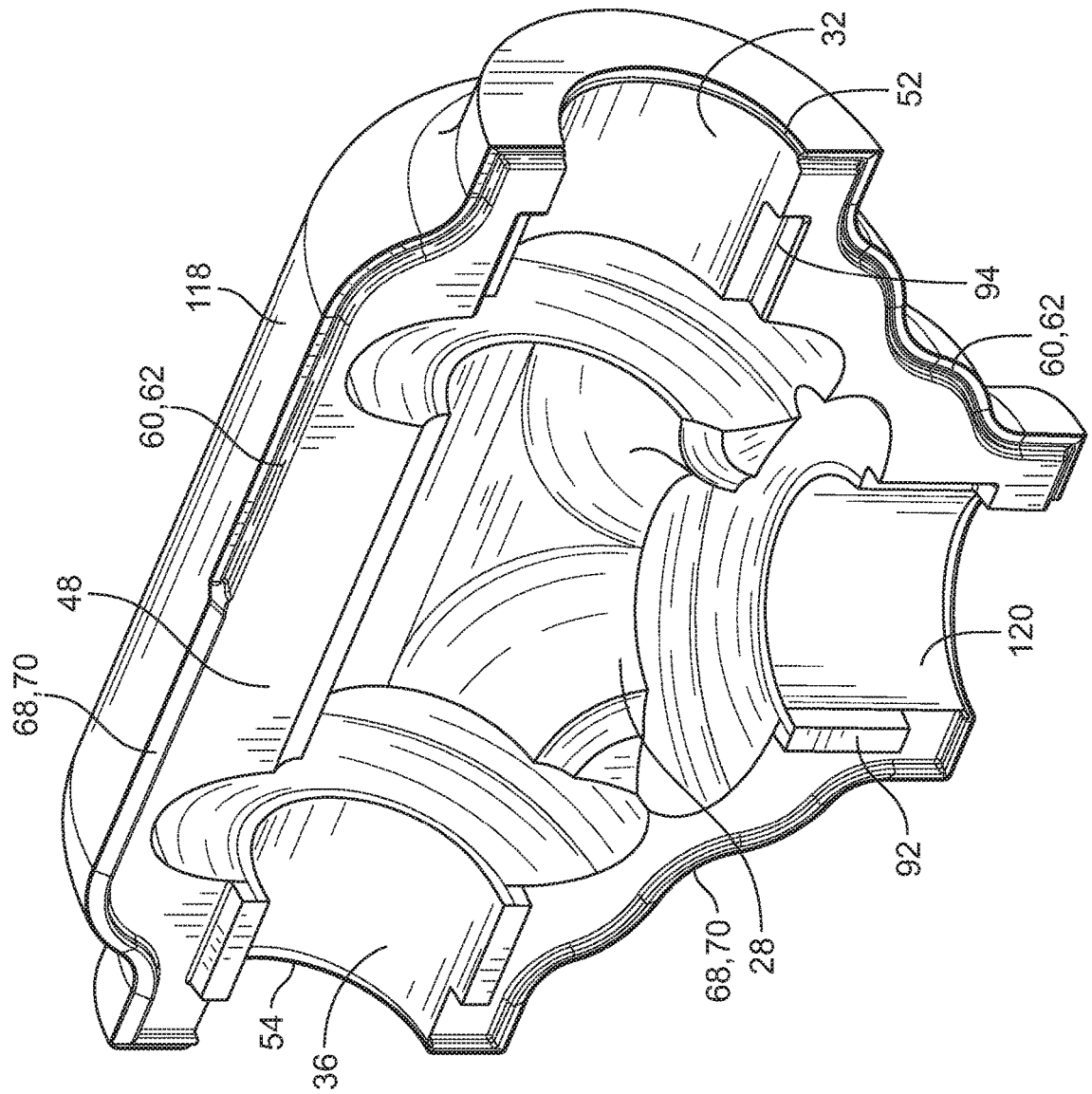
FIG. 15 is an isometric view showing the interior of a cover portion shown in FIG. 13.

FIGS. 13-15 show another example cover embodiment 108 used to cover an assembly joining a third pipe element 112 to first and second pipe elements 114 and 116. The first cover portion 118 defines a fifth channel 120 in fluid communication with the first recess 28 and the second cover portion 122 defines a sixth channel 124 in fluid communication with the second recess 38. When cover portions 118 and 122 are assembled (FIG. 13) they define a third bore 126 which is not aligned with the first and second bores 96 and 98. Cover 108 may be used with an assembly 128 (FIG. 14) comprising a Tee fitting 130 and first, second and third couplings 132, 134 and 136 joining first, second and third pipe elements 114, 116 and 112.

Figure 16:
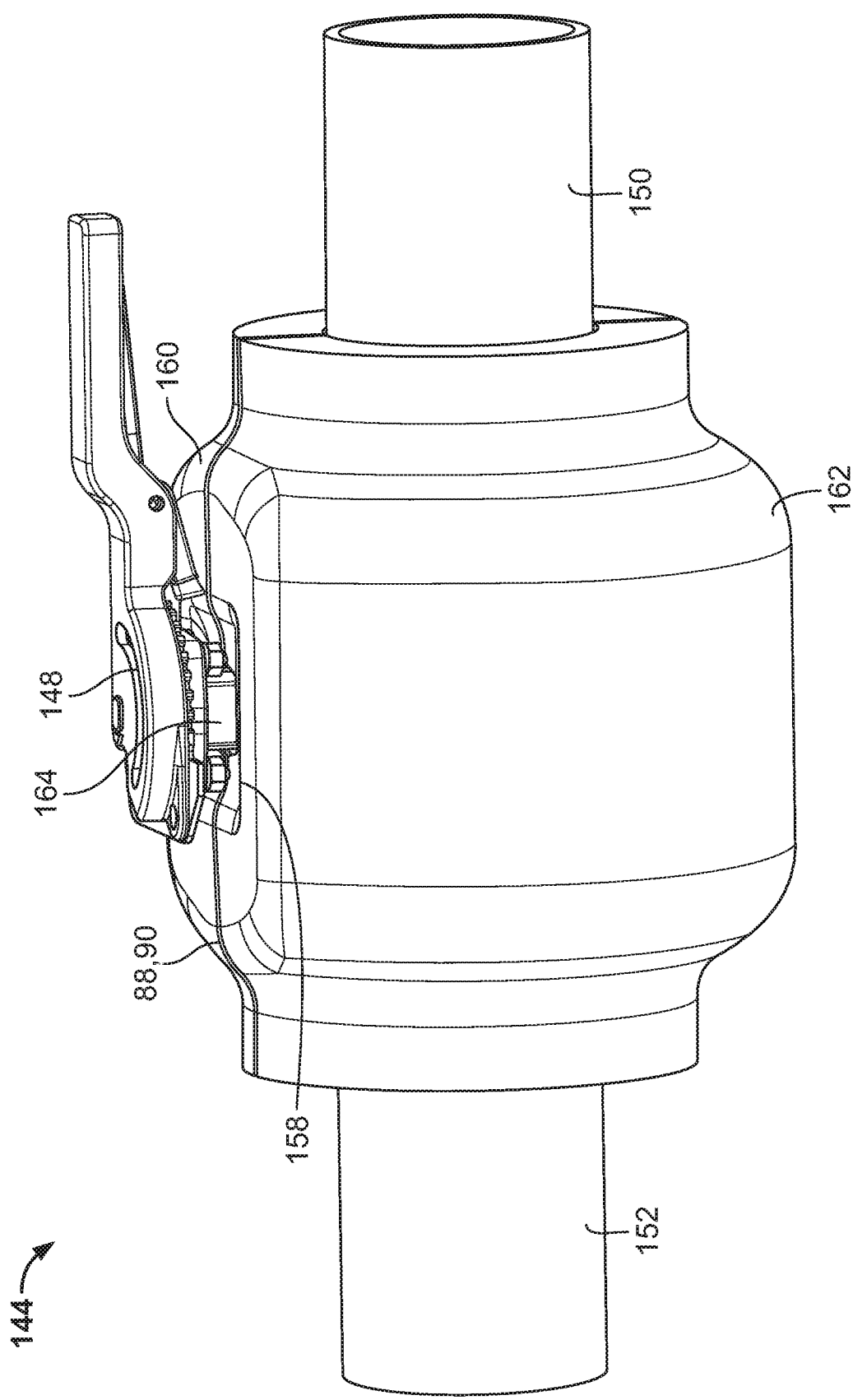
FIG. 16 is an isometric view of another example embodiment of a coupling according to the invention.
Figure 17:
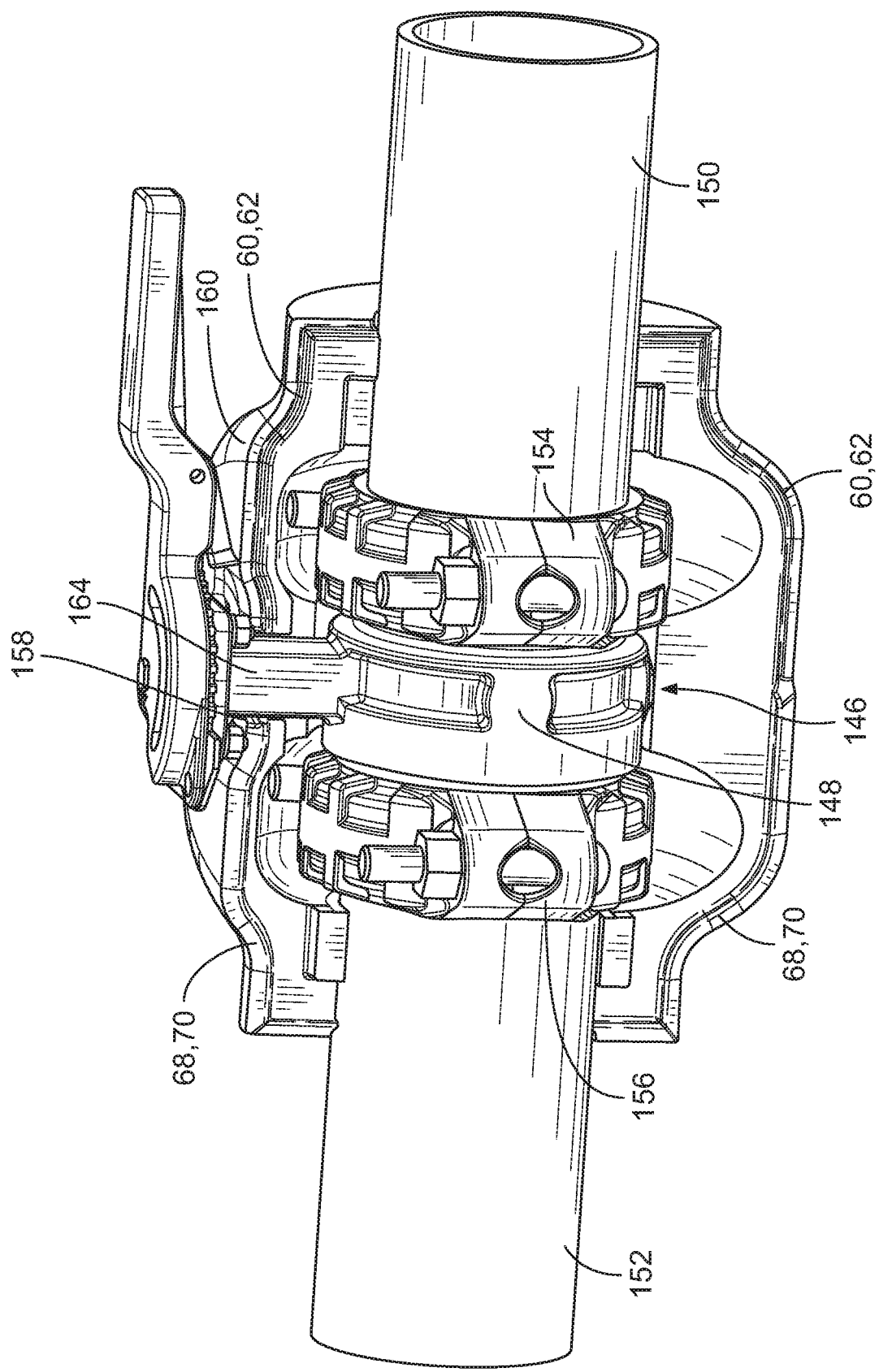
FIG. 17 is an isometric view of the coupling shown in FIG. 16 with a portion of the cover removed.
Figure 18:
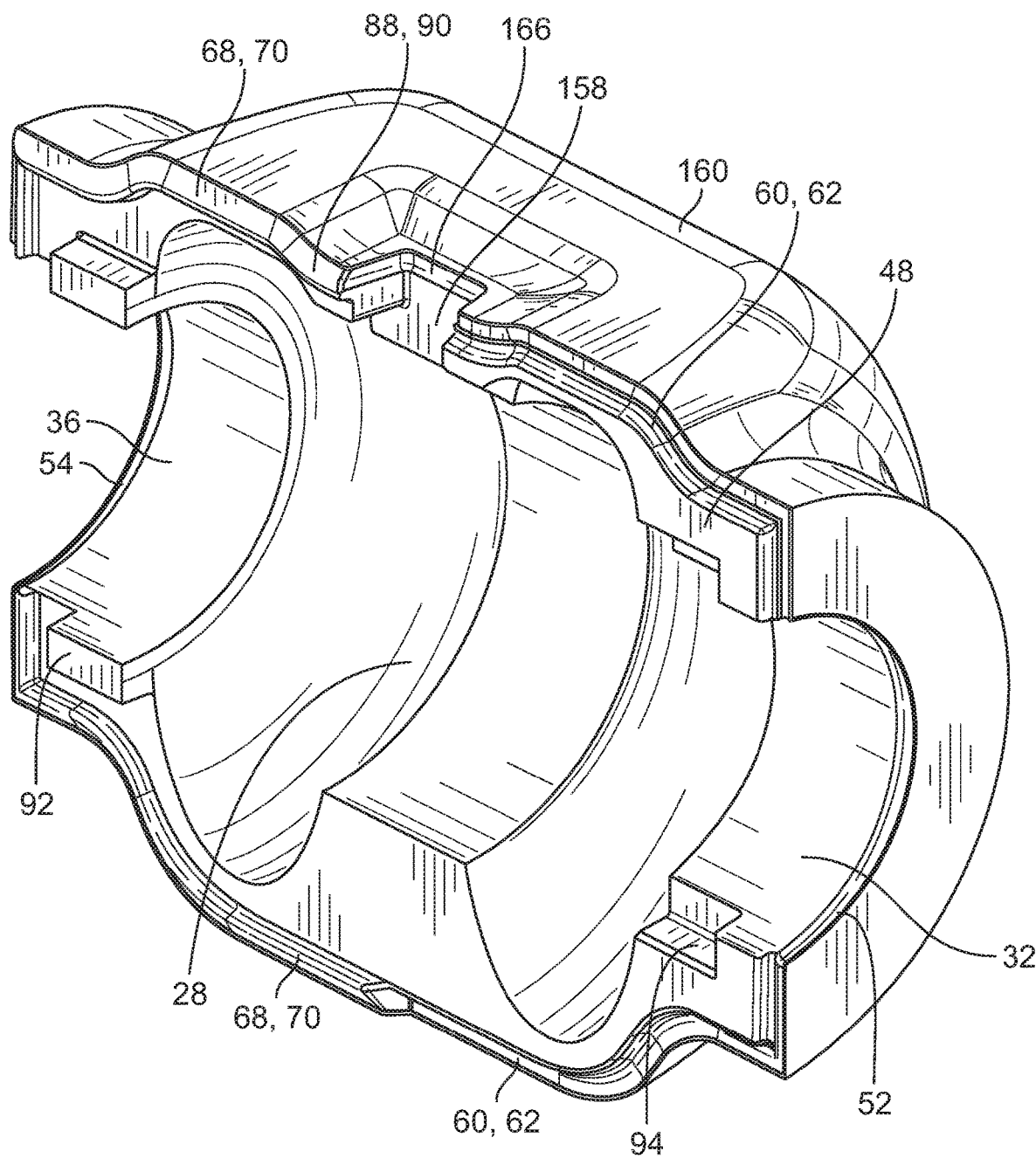
FIG. 18 is an isometric view showing the interior of a cover portion shown in FIG. 16.

FIGS. 16-18 show an example cover embodiment 144 for covering an assembly 146 (FIG. 17) comprising a valve 148 coupled to first and second pipe elements 150 and 152 using mechanical couplings 154 and 156. Cover 144 comprises openings 158 in the first and second cover portions 160 and 162 to accommodate the valve stem 164. As shown in FIG. 18 for cover portion 160, the opening 158 is located along the seam 88 between the cover portions and interrupting the furrow 90 (see also FIG. 16). First and second canals 166 extend along and surround the openings 158 in each cover portion (cover portion 160 shown). The canals 166 are in fluid communication with the furrow 90 and each receives a portion of the continuous seal (see FIG. 7) which effects a seal between the cover portions 160 and 162 and the valve stem 164. Thus even when the cover according to the invention is penetrated by an opening a continuous seal is maintained isolating the assembly from the ambient.

Although the example cover embodiments disclosed herein are substantially monolithic when the cover portions are joined, other embodiments are feasible wherein the covers comprise discrete sections which are assembled from portions and sealed to one another during assembly.

What is claimed is:

1. A cover positionable surrounding an assembly joining pipe elements, said cover comprising:
    a first cover portion defining a first recess for receiving said assembly, said first cover portion having a first sidewall defining a first channel and a second sidewall defining a second channel, said first and second channels being in communication with said first recess, said first and second channels for receiving said pipe elements;
    a second cover portion defining a second recess for receiving said assembly, said second cover portion having a third sidewall defining a third channel and a fourth sidewall defining a fourth channel, said third and fourth channels being in communication with said second recess, said third and fourth channels for receiving said pipe elements;
    a first perimeter face positioned on said first cover portion, said first perimeter face surrounding said first recess and said first and second channels, at least a first portion of said first perimeter face comprising a groove extending therealong;
    a second perimeter face positioned on said second cover portion, said second perimeter face surrounding said second recess and said third and fourth channels, at least a first portion of said second perimeter face comprising a tongue extending therefrom, said tongue of said first portion of said second perimeter face being received within said groove of said first portion of said first perimeter face when said first and second cover portions are joined to one another surrounding said assembly;
    a first canal positioned in said first sidewall transversely to said first channel;
    a second canal position in said second sidewall transversely to said second channel;
    a third canal positioned in said third sidewall transversely to said third channel; and
    a fourth canal positioned in said fourth sidewall transversely to said fourth channel.

2. The cover according to claim 1, wherein said groove of said first portion of said first perimeter face is in fluid communication with said first and said third canals when said first and second cover portions are joined to one another.

3. The cover according to claim 2, wherein said groove of said second portion of said second perimeter face comprises a surface oriented angularly with respect to said first perimeter face and thereby defining a furrow between said first and second cover portions.

4. The cover according to claim 1, wherein:
    at least a second portion of said first perimeter face comprises a tongue extending therefrom;
    at least a second portion of said second perimeter face comprises a groove extending therealong, said tongue of said second portion of said first perimeter face being received within said groove of said second portion of said second perimeter face when said first and second cover portions are joined to one another.

5. The cover according to claim 4, wherein said groove of said second portion of said second perimeter face is in fluid communication with said second and said fourth canals when said first and second cover portions are joined to one another.

6. The cover according to claim 4, wherein said groove in said first portion of said first perimeter face is in fluid communication with said groove in said second portion of said second perimeter face when said first and second cover portions are joined to one another.

7. The cover according to claim 1, wherein said groove of said first portion of said first perimeter face comprises a surface oriented angularly with respect to said second perimeter face and thereby defining a furrow between said first and second cover portions.

8. The cover according to claim 7, further comprising a seal positioned within said canals and within said furrow, said seal completely surrounding said first and second recesses.

9. The cover according to claim 8, further comprising an opening in said first and second cover portions, said opening being located along said first and second perimeter faces, a fifth canal on said first cover portion extending along said opening and a sixth canal extending along said second cover portion, said canals being in fluid communication with said furrow and receiving said seal.

10. The cover according to claim 8, wherein said seal is selected from the group consisting essentially of a continuous gasket, an extruded caulk, a rope caulk, and combinations thereof.

11. The cover according to claim 1, wherein said first and second cover portions comprise a foam layer.

12. The cover according to claim 11, wherein said foam layer has an insulation value of at least R=5 per inch of thickness.

13. The cover according to claim 11, wherein said foam layer comprises polyisocyanurate.

14. The cover according to claim 11, further comprising a coating of polyvinyldiene chloride on said foam layer.

15. The cover according to claim 11, further comprising an exterior coating surrounding said foam layer.

16. The cover according to claim 15, wherein said exterior coating is selected from the group consisting essentially of polyurea, polyvinylchloride, polyvinyldiene chloride and combinations thereof.

17. A cover positionable surrounding an assembly joining pipe elements, said cover comprising:
a first cover portion defining a first recess for receiving said assembly, said first cover portion having a first sidewall defining a first channel and a second sidewall defining a second channel, said first and second channels being in communication with said first recess, said first and second channels for receiving said pipe elements;
a second cover portion defining a second recess for receiving said assembly, said second cover portion having a third sidewall defining a third channel and a fourth sidewall defining a fourth channel, said third and fourth channels being in communication with said second recess, said third and fourth channels for receiving said pipe elements;
a first perimeter face positioned on said first cover portion, said first perimeter face surrounding said first recess and said first and second channels;
a second perimeter face positioned on said second cover portion, said second perimeter face surrounding said second recess and said third and fourth channels, said second perimeter face being engageable with said first perimeter face for joining said first and said second cover portions to one another surrounding said assembly;
a first canal positioned in said first sidewall transversely to said first channel;
a second canal position in said second sidewall transversely to said second channel;
a third canal positioned in said third sidewall transversely to said third channel; and
a fourth canal positioned in said fourth sidewall transversely to said fourth channel; wherein:
said first perimeter face comprises first and second alignment cutouts;
said second perimeter face comprises first and second alignment blocks, said first and second alignment cutouts having a complementary shape to said first and second alignment blocks so that said first and second alignment blocks interlock with said first and second alignment cutouts when said first and second cover portions are joined to one another.

18. The cover according to claim 17, wherein:
said first perimeter face comprises third and fourth alignment blocks;
said second perimeter face comprises third and fourth alignment cutouts, said third and fourth alignment cutouts having a complementary shape to said third and fourth alignment blocks so that said third and fourth alignment blocks interlock with said third and fourth alignment cutouts when said first and second cover portions are joined to one another.

19. The cover according to claim 18, wherein said alignment blocks are and said alignment cutouts are step-shaped.

20. A cover positionable surrounding an assembly joining first and second pipe elements to one another, said cover comprising:
a first cover portion defining a first recess for receiving said assembly, said first cover portion defining first and second channels for receiving said first pipe element, said first and second channels being in communication with said first recess;
a second cover portion defining a second recess for receiving said assembly, said second cover portion defining third and fourth channels for receiving said second pipe element, said third and fourth channels being in communication with said second recess;
said first and second cover portions being joined to one another to surround said assembly and said pipe elements at a seam, said seam comprising a furrow facing outwardly away from said first and second recesses, at least a portion of said seam being defined by a tongue extending from said first cover portion, said tongue being received within a groove positioned in said second cover portion, said furrow being defined by a first surface on one of said first and second cover portions oriented angularly with respect to a second surface on the other of said first and second cover portions, said first and second surfaces being in facing relationship.

21. The cover according to claim 20, wherein said furrow has an asymmetrical cross sectional shape.

22. The cover according to claim 20, further comprising a seal positioned within said furrow.

23. The cover according to claim 22, further comprising an opening in at least one of said cover portions, said opening being located along said seam and interrupting said furrow, a canal extending along said opening, said canal being in fluid communication with said furrow and receiving said seal.

24. The cover according to claim 22, wherein:
said first cover portion defines a first opening portion located along said seam;
said second cover portion defines a second opening portion located along said seam, said first and second opening portions being aligned to form an opening in said cover;
a first canal surrounding said first opening portion and in fluid communication with said furrow;
a second canal surrounding said second opening portion and in fluid communication with said furrow; wherein said seal is received in said first and second canals.

25. The cover according to claim 20, further comprising:
a first canal positioned within said first channel and in fluid communication with said furrow;
a second canal positioned within said second channel and in fluid communication with said furrow;
a third canal positioned within said third channel and in fluid communication with said furrow; and
a fourth canal positioned within said fourth channel and in fluid communication with said furrow.

26. The cover according to claim 25, wherein each of said canals has an asymmetrical cross section.

27. The cover according to claim 25, wherein each of said canals faces outwardly away from said first and second recesses.

28. The cover according to claim 25, further comprising a seal positioned within said canals and within said furrow, said seal completely surrounding said first and second recesses.

29. The cover according to claim 28, wherein said seal is selected from the group consisting essentially of a continuous gasket, an extruded caulk, a rope caulk, and combinations thereof.

30. The cover according to claim 20, wherein said first and second cover portions comprise a foam layer.

31. The cover according to claim 30, wherein said foam layer has an insulation value of at least R=5 per inch of thickness.

32. The cover according to claim 30, wherein said foam layer comprises polyisocyanurate.

33. The cover according to claim 30, further comprising a coating of polyvinyldiene chloride on said foam layer.

34. The cover according to claim 30, further comprising an exterior coating surrounding said foam layer.

35. The cover according to claim 34, wherein said exterior coating is selected from the group consisting essentially of polyurea, polyvinylchloride, polyvinyldiene chloride and combinations thereof.

36. The cover according to claim 20, wherein said first surface is positioned on said first cover portion adjacent to said tongue.

37. The cover according to claim 20, wherein said first and third channels surround a first bore, said second and fourth channels surround a second bore, and wherein said first and second bores are aligned with one another.

38. The cover according to claim 37 in combination with said assembly and said first and second pipe elements, wherein said assembly comprises a coupling joining said pipe elements in end to end relation.

39. The cover according to claim 37 in combination with said assembly and said first and second pipe elements, wherein said assembly comprises:
a valve;
a first pipe coupling attaching said first pipe elements to said valve;
a second pipe coupling attaching said second pipe element to said valve.

40. The cover according to claim 37 for further joining said first and second pipe elements to a third pipe element, wherein:
said first cover portion defines a fifth channel for receiving said third pipe element, said fifth channel being in communication with said first recess;
said second cover portion defines sixth channel for receiving said third pipe element, said sixth channel being in communication with said second recess; wherein
said fifth and sixth channels surround a third bore, said third bore not being aligned with said first and said second bores.

41. In combination, the cover according to claim 40, and said assembly and said first, second and third pipe elements, wherein said assembly comprises:
a Tee fitting;
a first coupling joining said first pipe element to said Tee fitting;
a second coupling joining said second pipe element to said Tee fitting;
a third coupling joining said third pipe element to said Tee fitting.

42. The cover according to claim 20, wherein said first and third channels surround a first bore, said second and fourth channels surround a second bore, and wherein said first and second bores are not aligned with one another.

43. In combination, the cover according to claim 42, and said assembly and said first and second pipe elements, wherein said assembly comprises:
an elbow fitting;
a first coupling joining said first pipe element to said elbow fitting;
a second coupling joining said second pipe element to said elbow fitting.

* * * * *